(12) United States Patent
Lee et al.

(10) Patent No.: US 7,178,404 B2
(45) Date of Patent: Feb. 20, 2007

(54) PRESSURE GAUGE FOR MEASURING PRESSURE IN LIQUID AND GASSEOUS MEDIA

(75) Inventors: Ren-Guey Lee, Tucheng (TW); Dong-Lin Chuang, Wuqi Town (TW); Hsi-Wen Wang, Jhongli (TW)

(73) Assignee: Metertek Technology Inc. (TW)

( * ) Notice: Subject to any disclaimer, the term of this patent is extended or adjusted under 35 U.S.C. 154(b) by 26 days.

(21) Appl. No.: 11/071,164

(22) Filed: Mar. 4, 2005

(65) Prior Publication Data

US 2005/0204827 A1    Sep. 22, 2005

(30) Foreign Application Priority Data

Mar. 18, 2004    (TW) .............. 93204084 U

(51) Int. Cl.
*G01L 7/00*    (2006.01)

(52) U.S. Cl. .......................... 73/756; 73/706

(58) Field of Classification Search .......... 73/700–756
See application file for complete search history.

(56) References Cited

U.S. PATENT DOCUMENTS

| | | | | | |
|---|---|---|---|---|---|
| 4,128,006 | A | * | 12/1978 | Grabow | 73/724 |
| 4,776,219 | A | * | 10/1988 | Friedrich | 73/726 |
| 4,890,497 | A | * | 1/1990 | Cahill | 73/708 |
| 5,048,181 | A | * | 9/1991 | Grider | 29/840 |
| 5,090,247 | A | * | 2/1992 | Liebgen | 73/727 |
| 6,176,138 | B1 | * | 1/2001 | Barr et al. | 73/756 |
| 6,561,039 | B2 | * | 5/2003 | Ozawa | 73/756 |

* cited by examiner

*Primary Examiner*—Edward Lefkowitz
*Assistant Examiner*—Jermaine Jenkins
(74) *Attorney, Agent, or Firm*—Bacon & Thomas PLLC

(57) ABSTRACT

A pressure gauge comprising a thread tube, a printed circuit board carrying a pressure sensing device installed on one side of the printed circuit board and tightly packed with silicon rubber to form the end cover of the thread tube. When used for testing the pressure of acidic or alkaline liquid the pressure sensing device of the pressure gauge will not be brought into contact with the liquid, but can sense the pressure through the silicon rubber packing to test the pressure of the acidic or alkaline liquid, and the range of application of the pressure gauge covers the test of pressure of gas, acidic liquid, alkaline liquid and low pressure gas.

17 Claims, 4 Drawing Sheets

PRESSURE GAUGE FOR MEASURING PRESSURE IN LIQUID AND GASSEOUS MEDIA

BACKGROUND OF THE PRESENT INVENTION

1. Field of the Present Invention

This invention relates to a pressure gauge, more particularly to a pressure gauge having structural improvement suitable for measuring pressure in acidic liquid, alkaline liquid and low pressure gas.

2. Description of Prior Act

A gas pressure gauge 90 shown in FIG. 1 is a conventional mechanical type Bourdon Tube pressure gauge. Since the gas pressure gauge 90 has mechanical type structure, it is not suitable for being brought into contact with acidic or alkaline liquid, and is therefore only suitable for measuring pressure in gas, but not suitable for measuring pressure in acidic liquid or alkaline liquid.

And, another conventional electronic type pressure gauge is still not suitable for handling the acidic liquid or alkaline liquid due to structural design of its parts that give rise to the same drawback of being restricted to measure pressure gas and not suitable for measuring pressure in acidic liquid or alkaline liquid. Besides, the conventional electronic type pressure gauge is not suitable for measuring gas pressure in lower pressure level.

SUMMARY OF THE PRESENT INVENTION

The major purpose of this invention is to extend the range of application of pressure gauge suitable for measuring pressure in gaseous media, acidic liquid and alkaline liquid, and especially in low pressure gas.

The structural improvement on pressure gauge of this invention comprises a thread tube and a printed circuit board carrying a pressure sensing device installed on its bottom, particularly the printed circuit board is formed as an end cover of said thread tube, and the pressure sensing device of the printed circuit board is tightly packed with silicon rubber material which possesses the properties of acid-resisting and alkaline-resisting, therefore, when the pressure gauge is used for measuring the pressure of acidic or alkaline liquid the pressure sensing device will not be brought into contact with the liquid but can sense the pressure of the acidic liquid or alkaline liquid through the silicon rubber packing material that enables the pressure gauge of this invention to be suitable for measuring pressure in gaseous media, acidic liquid and alkaline liquid, and especially in low pressure gas.

The structural improvement on pressure gauge of this invention further comprises either a conic multiple-balls-sintered filter or replaced by a tack-shaped multiple-balls-sintered filter with damping effect to absorb and reduce pressure impaction instantaneously, directly and repeatedly impacted on the silicon rubber packed around the pressure sensing device for protecting the silicon rubber from damage and abrasion even from being peeled off.

BRIEF DESCRIPTION OF THE DRAWING FIGURES

DETAILED DESCRIPTION OF THE PREFERRED EMBODIMENTS

Figure 1:
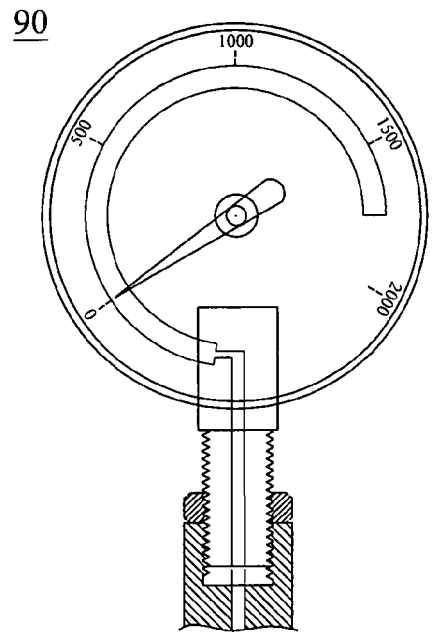
FIG. 1 is a schematic drawing of conventional type Bourdon Tube pressure gauge.
Figure 2:
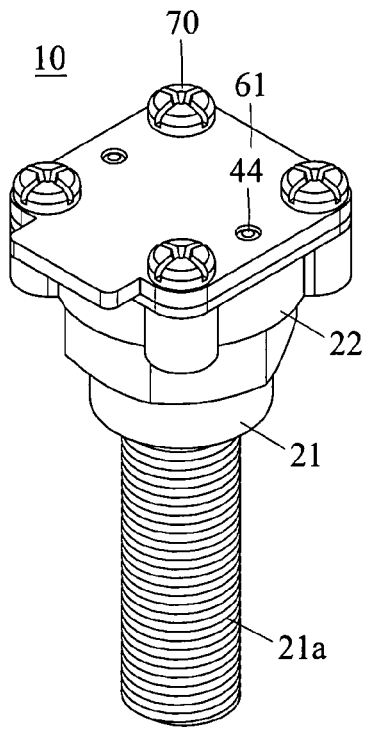
FIG. 2 is a perspective drawing of pressure gauge of this present invention.
Figure 3:
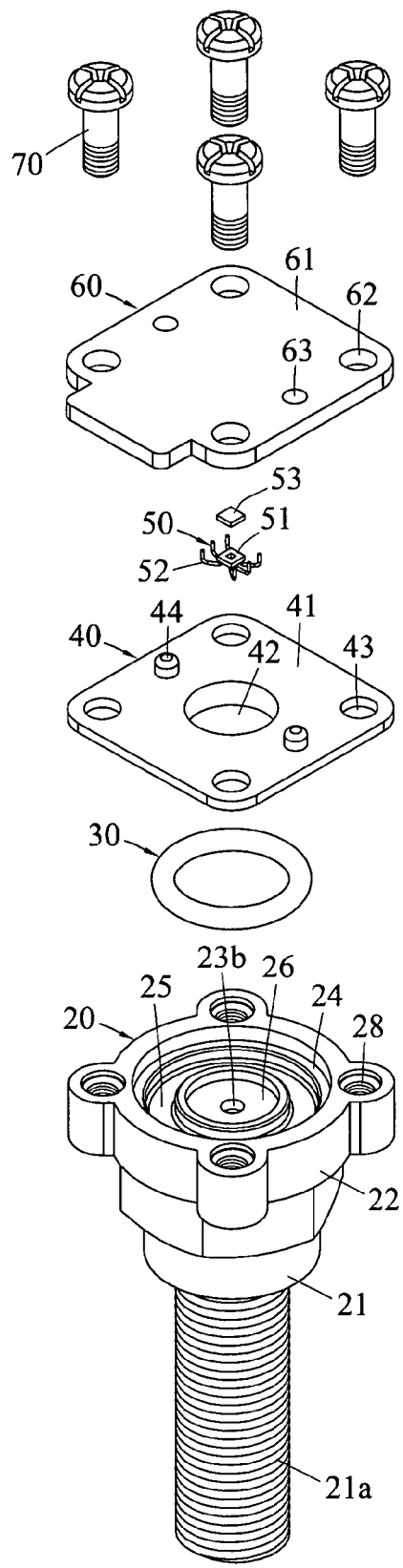
FIG. 3 is an exploded drawing of the pressure gauge of this present invention shown in FIG. 2.
Figure 4:
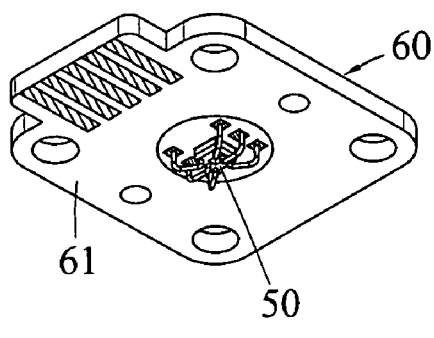
FIG. 4 is a perspective drawing of a printed circuit board viewed from different direction being shown in FIG. 2 to illustrate a pressure sensing device is directly installed on the printed circuit board.

Referring to from FIG. 2 to FIG. 4, the basic structural arrangement of a pressure gauge 10 disclosed by this present invention at least comprises a thread tube 20 and a printed circuit board 60 carrying a pressure sensing device 50 installed on one side of the printed circuit board 60.

Figure 6:
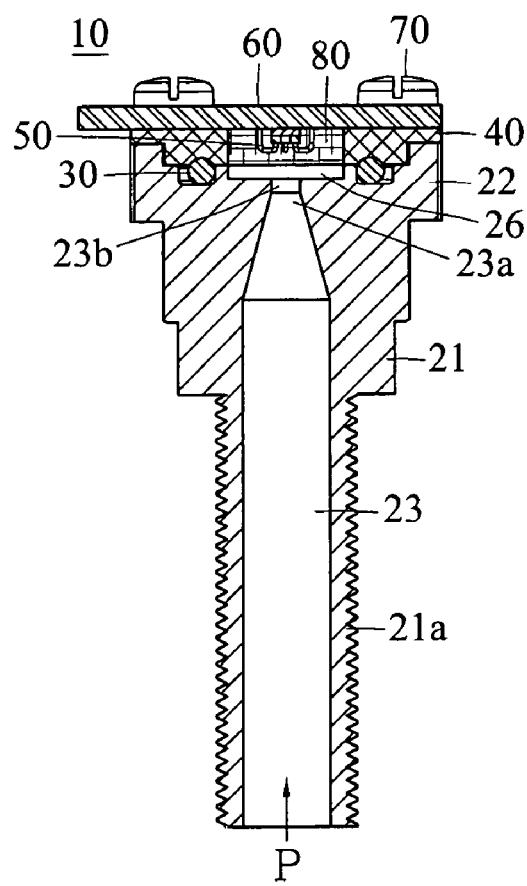
FIG. 6 is a sectional and schematic drawing of the pressure gauge of this present invention shown in FIG. 2.

The structure of thread tube 20 is shown as in FIG. 3 and FIG. 6 which comprises a connecting tube 21 with a pipe shaft 21a and a base seat 22 formed integrally on the upper end of the connecting tube 21.

The pipe shaft 21a of the connecting tube 21 is provided with external thread through which the pressure gauge 10 is capable of being installed on equipment where the fluid pressure shall be measured. As shown in FIG. 6, the internal structure of the connecting tube 21 is formed as a reducing passage 23 having a reducing throat 23a formed on its upper end.

Further referring to FIG. 3 and FIG. 6, the base seat 22 integrally formed on the upper end of the connecting tube 21 has a circular hollow step 24, a circular groove 25 and a recession 26 which has a small hole 23b penetrating the bottom of the recession 26 and connecting the throat 23a of the reducing passage 23 of the thread tube 20.

The circular groove 25 of the base seat 22 is provided for mounting a leak-prevention rubber ring 30. And, several screw holes 28 are provided on the base seat 22 through which the printed circuit board 60 carrying a pressure sensing device 50, the leak-prevention rubber ring 30 and the thread tube 20 can be assembled together to form the pressure gauge 10, and the whole assembly shall be tightly fastened by screw 70 to enable the effect of leak-prevention.

As shown in FIG. 3 and FIG. 4, the printed circuit board 60 has a main-body 61 which has printed circuit arranged on the board surface, and, as shown in FIG. 6, the main-body 61 is directly used as a sealing cover installed on the base seat 22 of the thread tube 20 of the pressure gauge 10.

On the main-body 61 of the printed circuit board 60 several fastening holes 62 are provided with location arrangement corresponding to the location of the screw holes 28 formed on the base seat 22 of the thread tube 20.

When the printed circuit board 60 as a sealing cover is correctly mounted on the base seat 22 of the thread tube 20, the whole assembly of the printed circuit board 60, the leak-prevention rubber ring 30 and the thread tube 20 shall be tightly and firmly fastened by the fastening screws 70 to form the pressure gauge 10 of the invention and to enable the leak-preventive effect by installing the leak-prevention rubber ring 30.

In addition, due to the tightening force exerted by the fastening screw 70 on the printed circuit board 60 and the thread tube 20 the pressure gauge 10 of this invention can increase the capacity of bearing higher pressure to prevent crack or damage of the printed circuit board 60 caused by high pressure of the fluid being tested.

As shown in FIG. 3, FIG. 4 and FIG. 6, the pressure sensing device 50 carried on the main-body 61 of printed circuit board 60 has a high sensitivity pressure-sensitive chip 51 as its main part, and the pressure sensing device 50 is securely fixed on the main-body 61 of the printed circuit board 60 by means of jump connection leading-out wire 52 and glass plate 53 that enables an electric connection with the printed circuit on the printed circuit board 60.

As shown in FIG. 6, the pressure sensing device 50 is packed with silicon rubber 80 to make the pressure sensing device 50 be completely and tightly packed inside the silicon rubber 80 and completely isolated from the gas or acidic liquid or alkaline liquid being tested, but still may sense and measure the pressure transmitted by the gas or fluid through small hole 23b of thread tube 20 and silicon rubber 80. Especially, the gas pressure of lower pressure range can be measured by the high sensitivity pressure sensitive chip 51 that enables the pressure gauge 10 of the invention appropriate for testing the pressure of gas, acidic liquid, alkaline liquid and low-pressure gas.

Figure 5:
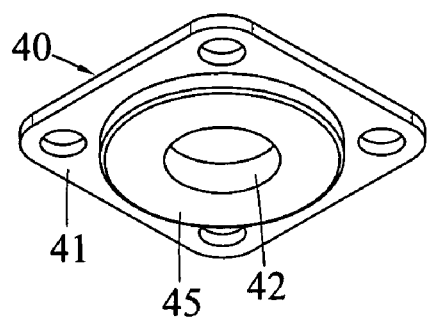
FIG. 5 is a perspective drawing of a rubber filling plate viewed from different direction being shown in FIG. 2 to illustrate the rubber filling plate has a protruding portion formed at its bottom.

Referring to FIG. 3, FIG. 5 and FIG. 6, in order to have the pressure sensing device 50 completely and tightly packed inside the silicon rubber 80, one of the preferred embodiments of the invention is further to adhere a rubber filling plate 40 onto the main-body 61 of the printed circuit board 60. This rubber filling plate 40 has a main-body 41 with a hollow portion 42 used to accommodate the pressure sensing device 50 already fixed on the main-body 61 of printed circuit board 60. Then, after to fill silicon rubber 80 into the hollow portion 42 of the rubber filling plate 40, the pressure sensing device 50 shall be completely and tightly packed and sealed inside the silicon rubber 80.

Several fastening holes 43 are also provided on main-body 41 of the rubber filling plate 40 with location arrangement corresponding to the location of the screw holes 28 formed on the base seat 22 of thread tube 20. In addition, on the bottom side of main-body 41 of the rubber filling plate 40 a protruding portion 45 is provided corresponding to the circular hollow step 24 being formed on base seat 22 of the thread tube 20, therefore, after the rubber filling plate 40 is adhere to the main-body 61 of the printed circuit board 60, the whole assembly of the printed circuit board 60 and the rubber filling plate 40 can be correctly installed on the base seat 22 of the thread tube 20 by aligning the protruding portion 45 of the rubber filling plate 40 into the circular hollow step 24 of the base seat 22, so that the protruding portion 45 of rubber filling plate 40 shall be tightly fitted on the leak-prevention rubber ring 30 to enable the effect of leak-prevention when the printed circuit board 60 and the thread tube 20 are assembled together to form the pressure gauge 10 of the invention.

However, for the convenience of adhering and fixing the rubber filling plate 40 on the printed circuit board 60 in correct position, several aligning holes 63 are provided on the main-body 61 of the printed circuit board 60 to match the aligning pins 44 provided on the main-body 41 of the rubber filling plate 40. These two parts may be joined together by applying adhesives on the rubber filling plate 40 at first, and then mount the rubber filling plate 40 on the print circuit board 60 by inserting the aligning pin 44 into the aligning holes 63 to enable an accurate and firm joining.

According to the above-mentioned description, since the rubber filling plate 40 and leak-prevention rubber ring 30 are made of acid-resisting and alkali-resisting material, therefore, when the printed circuit board 60 and the thread tube 20 are assembled together to form the pressure gauge 10 as illustrated in FIG. 6, the pressure sensing device 50 on the printed circuit board 60 is located on the upper side of the recession 26 of base seat 22 of the thread tube 20, and is tightly packed with silicon rubber 80. When the pressure sensing device 50 of the invention is brought to bearing the pressure of gas or liquid, the pressure sensing device 50 will not be brought into contact with gas, acidic liquid or alkaline liquid, or even the low pressure gas etc.

Moreover, the pressure gauge 10 of this present invention using the printed circuit board 60 to form the cover of the base seat 23 of the thread tube 20 and directly installing the pressure sensing device 50 on the printed circuit board 60 may decrease the measuring signal loss or distortion and increase the measuring accuracy, when the pressure head P happened in reducing passage 23 of the thread tube 20 is transmitted through hole 27 of base seat 22 of the thread tube 20 and silicon rubber 80 and is then sensed by the pressure sensing device 50.

When the pressure gauge 10 of this present invention is applied to measure pressure in high pressure gas, the silicon rubber 80 packed around the pressure sensing device 50 carried on the printed circuit board 60 shall be seriously impacted by higher pressure transmitted from the measured gas pressure and may be damaged or peeled off due to repeatedly pressure impaction.

Figure 7:
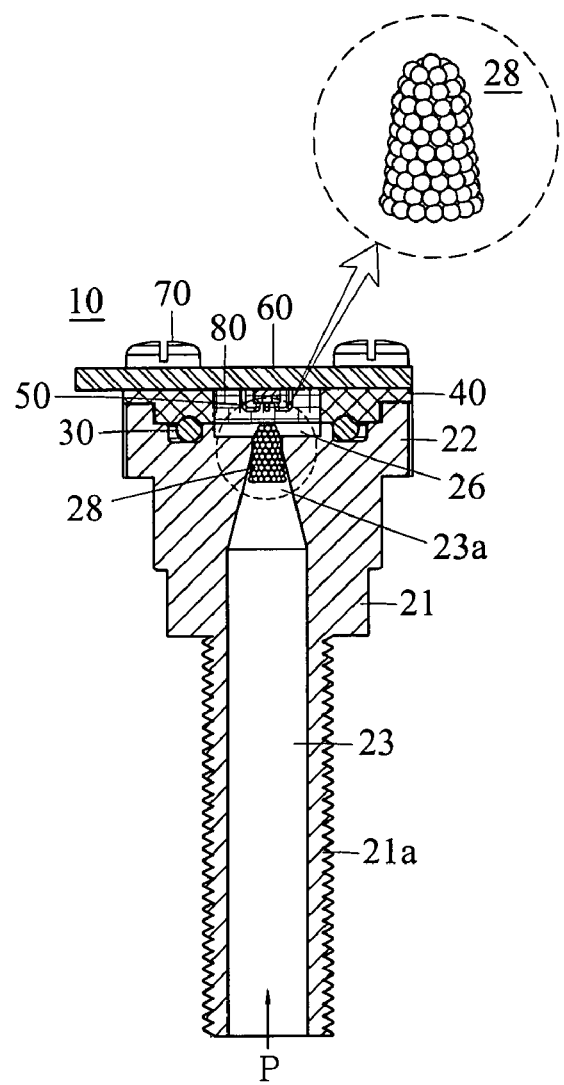
FIG. 7 is the sectional and schematic drawing of another preferred embodiment of this present invention to illustrate the invented pressure gauge further comprising a conic multiple-balls-sintered filter with damping effect to protect silicon rubber from damage and abrasion.

For protecting and preventing the silicon rubber 890 of this present invention from damage and abrasion even from being peeled off during use in measuring higher gas pressure, another preferred embodiments of this present invention is shown as in FIG. 7 which is further comprising a conic multiple-balls-sintered filter 28 with damping effect to absorb and reduce pressure impaction transmitted from measured gas pressure instantaneously, directly and repeatedly impacted on the silicon rubber 80. And, the conic multiple-balls-sintered filter 28 is installed on the throat 23a of the reducing passage 23 of the connecting tube 21 by its tip inserted inside the small hole 23b of the base seat 22 of the thread tube 20.

Figure 8:
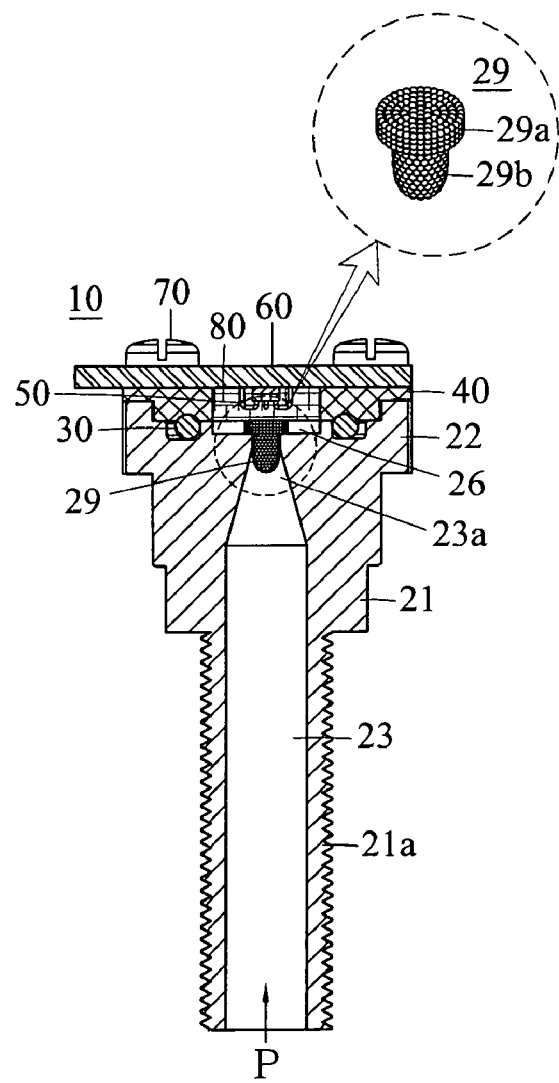
FIG. 8 is the sectional and schematic drawing of another preferred embodiment of this present invention to illustrate the invented pressure gauge further comprising a tack-shaped multiple-balls-sintered filter with damping effect to protect silicon rubber from damage and abrasion.

As shown in FIG. 8, the conic multiple-balls-sintered filter 28 used on this present invention may be further replaced by a tack-shaped multiple-balls-sintered filter 29 which has a head 29a installed inside the recession 26 of the base seat 22 and a pin-body 29b inserted inside the small hole 23b of the base seat 22 of the thread tube 20 to protect the silicon rubber 80 from damage due to pressure impaction.

What is claimed is:

1. A pressure gauge comprising a thread tube and a printed circuit board carrying a pressure sensing device, wherein the printed circuit board is installed on the upper end of the thread tube as its cover, the thread tube comprises a connecting tube having inner structure formed into a reducing passage with a throat formed on its upper end and a base seat integrally formed on the upper end of the connecting tube, the base seat has a small hole connected to and for communication with the throat of the reducing passage of the connecting tube, and the pressure sensing device carried on the printed circuit board is tightly packed with silicon rubber and is located on the upper side of the small hole; wherein the printed circuit board further carries a rubber filing plate with a hollow portion fixed on its bottom side, and the pressure sensing device carried on the printed circuit board is accommodated inside the hollow portion of the rubber filling plate and is packed and filled up with silicon rubber.

2. The pressure gauge as defined in claim 1, wherein the base seat of the thread tube has ring shaped groove and a leak-prevention rubber ring is mounted therein.

3. the pressure gauge as defined in claim 2, wherein the printed circuit board further carries a rubber filling plate with a hollow portion fixed on its bottom side, and the pressure sensing device carried on the printed circuit board is accommodated inside the hollow portion of the rubber filling plate and is packed and filled up with silicon rubber.

4. The pressure sensing device as defined in claim 3, wherein the base seat of the thread tube has a circular hollow step, and the rubber filling plate has a protruding portion on the bottom side arranged corresponding to the circular hollow step of the base seat for forming tight connection between the rubber filling plate and the base seat.

5. The pressure gauge as defined in claim 4, wherein the printed circuit board has an aligning hole, and the rubber filling plate has an aligning pin corresponding to the said aligning hole for accurately and conveniently connecting the rubber filling plate and the printed circuit board.

6. The pressure gauge as defined in claim 3, wherein the printed circuit board has an aligning hole, and the rubber filling plate has an aligning pin corresponding to the said aligning hole for accurately and conveniently connecting the rubber filling plate and the printed circuit board.

7. The pressure gauge as defined in claim 3 further comprising a conic multiple-balls-sintered filter installed on the throat of the reducing passage of the connecting tube by its tip inserted inside the small hole of the base seat.

8. The pressure gauge as defined in claim 3 further comprising a tack-shaped multiple-balls-sintered filter having a head installed inside the recession of the base seat and a pin-body inserted inside the small hole of the base seat.

9. The pressure gauge as defined in claim 2 further comprising a conic multiple-balls-sintered filter installed on the throat of the reducing passage of the connecting tube by its tip inserted inside the small hole of the base seat.

10. The pressure gauge as defined in claim 2 further comprising a tack-shaped multiple-balls-sintered filter having a head installed inside the recession of the base seat and a pin-body inserted inside the small hole of the base seat.

11. The pressure sensing device as defined in claim 1, wherein the base seat of the thread tube has a circular hollow step, and the rubber filling plate has a protruding portion on the bottom side arranged corresponding to the circular hollow step of the base seat for forming tight connection between the rubber filling plate and the base seat.

12. The pressure gauge as defined in claim 11, wherein the printed circuit board has an aligning hole, and the rubber filling plate has an aligning pin corresponding to the aligning hole for accurately and conveniently connecting the rubber filing plate and the printed circuit board.

13. The pressure gauge as defined in claim 1, wherein the printed circuit board has an aligning hole, and the rubber filling plate has an aligning pin corresponding to the aligning hole for accurately and conveniently connecting the rubber filling plate and the printed circuit board.

14. The pressure gauge as defined in claim 1 further comprising a conic multiple-balls-sintered filter installed on the throat of the reducing passage of the connecting tube by its tip inserted inside the small hole of the base seat.

15. The pressure gauge as defined in claim 1 further comprising a tack-shaped multiple-balls-sintered filter having a head installed inside the recession of the base seat and a pin-body inserted inside the small hole of the base seat.

16. A pressure gauge comprising a thread tube and a printed circuit board carrying a pressure sensing device, wherein the printed circuit board is installed on the upper end of the thread tube as its cover, the thread tube comprises a connecting tube having inner structure formed into a reducing passage with a throat formed on its upper end and a base seat integrally formed on the upper end of the connecting tube, the base seat has a small hole connected to and for communication with the throat of the reducing passage of the connecting tube, and the pressure sensing device carried on the printed circuit board is tightly packed with silicon rubber and is located on the upper side of the small hole; wherein a conic multiple-balls-sintered filter is installed on the throat of the reducing passage of the connecting tube by its tip inserted inside the small hole of the base seat.

17. A pressure gauge comprising a thread tube and a printed circuit board carrying a pressure sensing device, wherein the printed circuit board is installed on the upper end of the thread tube as its cover, the thread tube comprises a connecting tube having inner structure formed into a reducing passage with a throat formed on its upper end and a base seat integrally formed on the upper end of the connecting tube, the base seat has a small hole connected to and for communication with the throat of the reducing passage of the connecting tube, and the pressure sensing device carried on the printed circuit board is tightly packed with silicon rubber and is located on the upper side of the small hole; wherein a tack-shaped multiple-balls-sintered filter having a head is installed inside the recession of the base seat and a pin-body inserted inside the small hole of the base seat.

* * * * *